(12) United States Patent
Lee et al.

(10) Patent No.: US 6,170,040 B1
(45) Date of Patent: Jan. 2, 2001

(54) SUPERSCALAR PROCESSOR EMPLOYING A HIGH PERFORMANCE WRITE BACK BUFFER CONTROLLED BY A STATE MACHINE TO REDUCE WRITE CYCLES

(75) Inventors: Suk Joong Lee; Han Heung Kim, both of Kyoungki-do (KR)

(73) Assignee: Hyundai Electronics Industries Co., Ltd., Ichon-shi (KR)

( * ) Notice: Under 35 U.S.C. 154(b), the term of this patent shall be extended for 0 days.

(21) Appl. No.: 08/964,133

(22) Filed: Nov. 6, 1997

(30) Foreign Application Priority Data

Nov. 6, 1996 (KR) .................................. 96-52478

(51) Int. Cl.[7] .............................. G06F 13/00; G06F 9/38
(52) U.S. Cl. ............................ 711/143; 711/169; 710/52; 712/23
(58) Field of Search ..................... 711/143, 169, 711/141, 167; 710/52, 60, 61, 35; 712/23

(56) References Cited

U.S. PATENT DOCUMENTS

| | | | |
|---|---|---|---|
| 5,131,083 | * | 7/1992 | Crawford et al. ...................... 710/29 |
| 5,594,864 | * | 1/1997 | Trauben ................................. 714/39 |
| 5,596,731 | * | 1/1997 | Martinez, Jr. et al. .............. 711/122 |
| 5,603,047 | * | 2/1997 | Caulk, Jr. ............................. 712/23 |
| 5,659,709 | * | 8/1997 | Quach .................................. 711/141 |
| 5,699,548 | * | 12/1997 | Choudhury et al. ................ 711/143 |
| 5,768,558 | * | 6/1998 | Iyengar et al. ...................... 711/143 |

* cited by examiner

*Primary Examiner*—Glenn Gossage
(74) *Attorney, Agent, or Firm*—Jacobson, Price, Holman & Stern PLLC

(57) ABSTRACT

A microprocessor of a superscalar structure having a datapath, a data cache, a bus unit and first and second pipelines includes a write buffer equipped in the bus unit and a write back buffer in the data cache to reduce write cycles. The write buffer receives data of a burst write cycle from the write back buffer and data of a single write cycle from the datapath. The write buffer in the microprocessor allows data to be written in the write buffer and then to be written in the external memory when the microprocessor is available for performing an external cycle. The processor includes a state machine to control the write buffer and also includes one write buffer for each of the first and second pipelines in order to diminish the write cycles. The write buffers also include a bit block which indicates whether information in the write buffer is written by a cache miss or a hit in a line having a shared state. The state machine includes idle, request, service, backoff (BOFF) and update states in controlling write cycle progression in a pipeline.

5 Claims, 5 Drawing Sheets

SUPERSCALAR PROCESSOR EMPLOYING A HIGH PERFORMANCE WRITE BACK BUFFER CONTROLLED BY A STATE MACHINE TO REDUCE WRITE CYCLES

FIELD OF THE INVENTION

The present invention relates to a processor having a high performance in a write cycle and, more particularly, to a processor capable of lessening a bottle neck caused systematically, by employing a write buffer and a state machine controlling the write buffer and diminishing write cycles.

DESCRIPTION OF THE PRIOR ART

There is generally caused in a conventional processor a bottle neck in a systematical performance thereof, since data is processed much more quickly in a processor than in a memory or a peripheral input/output apparatus. For settling such shortcomings, it has been employed to install a cache in a processor; that is, a curtailment of cycles for most cycles is actually realized through a processing via an internal cache in place of processing via an external memory.

All bus cycles are not, however, processed via the internal cache contained in the processor and it is not a fundamental solution in preventing a bus cycle from being processed externally. In spite of an internal installment of the cache therein, in case of an occurrence of a cache miss or in case of an inevitable necessity of an external cycle processing required for a cache data coherency algorithm, internal core units should wait until corresponding operations of the bus unit are finished in an external memory having a comparatively slow process speed or in a secondary cache, which brings about an overall performance drop of a system. In a microprocessor of a superscalar structure having a plurality of pipelines, specially, it is inevitable to need a system for settling such defect since its occurrence rate is higher than in a processor having a single pipeline structure.

For example, a complex instruction set computer (CISC) having complicated instruction words uses many more memory operands in comparison with a reduced instruction set computer (RISC), thus a processor having the CISC structure may function with a higher performance by decreasing the number of cycles in a memory access. An internal cache is employed for reducing such cycles and the processor may process an operation required in the internal cache when an address line desired therein is discovered.

A reading operation is generally available in reading data since its operation is not to change the data. However, a care needs to be taken in writing data since its operation is to change data of an address to be written. If a changed data is written in the internal cache and not written in an external memory, there exists old data in the external memory. If an outer another bus master tries to write data in the external memory and a line of its corresponding address exists at the internal cache, only the data at the memory is changed while the internal cache stores old data. Such problems caused between cache data and memory data in case of using the cache in a system having several numbers of bus masters need to be settled in the cache data coherency algorithm. For the cache coherency settlement, the microprocessors use several kinds of schemes and there is omitted a detailed description in the present invention since the invention is related specially to a write buffer.

In the processor, e.g., the Pentium™ microprocessor from Intel Corp., San Jose, Calif., a difference between the cache data and the memory data is settled through a use of a write once policy which is to process a external cycle, at one time, for an initial writing. In other words, despite an installment of the internal cache, a necessity of the external write cycle is required for the cache data coherency algorithm with the exterior data. Also, the write cycle is inevitable to be processed externally in case of an occurrence of the cache miss.

As above-mentioned, it is difficult to settle completely the bottle neck in the system performance, with only installment of the internal cache, in case of an inevitable external cycle process. That is, the internal core units need to wait until the bus unit is used for the external memory having a comparatively slow process speed or the secondary cache, which degrades an overall performance of the system.

SUMMARY OF THE INVENTION

It is, therefore, a primary object of the invention to provide a processor capable of lessening a bottle neck caused systematically, by employing a write buffer and a state machine controlling the write buffer and diminishing write cycles.

In accordance with the present invention, in reading data, external units should wait until a reading operation is finished since the data must be used subsequently. In writing the data, the external units do not need to wait until a writing operation is completely finished since the data is not used subsequently. Considering this aspect, in a case the bus cycle should be inevitably processed externally, a write buffer capable of allowing a subsequent operation to be done is employed in the present invention since the writing operation does not have a direct influence upon the subsequent operation. Especially in the superscalar structure, one write buffer is respectively provided with every each pipeline for the sake of a higher performance.

Accordingly, the internal core unit regards the writing in the write buffer instead of an actual process of a external write cycle, as a completion of a writing operation, then performs a next operation; when it also becomes a situation for using a CPU bus, data of the write cycle stored in the write buffer may be processed externally. The core unit regards such operation of the write buffer as a process of the external cycle and the write buffer is made up of several blocks storing information, e.g., a write address, data, a volume of the operand etc.

In a microprocessor of a superscalar structure having a datapath, a data cache and a bus unit, the microprocessor include a write buffer equipped in the bus unit and a write back buffer installed at the data cache. In this case, data of a burst write cycle is received through the write back buffer and data of a single write cycle is received through a path from the datapath to the write buffer of the bus unit.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

The preferred embodiment of the present invention is described in detail as follows, referring to the accompanying drawings.

The inventive write buffer is employed in the microprocessor, wherein data is first written in the write buffer and then is written in an external memory when the system is available for performing an external cycle. The use of such inventive write buffer enables the cycles to be lessened and a systematical performance to be heightened.

Figure 1:
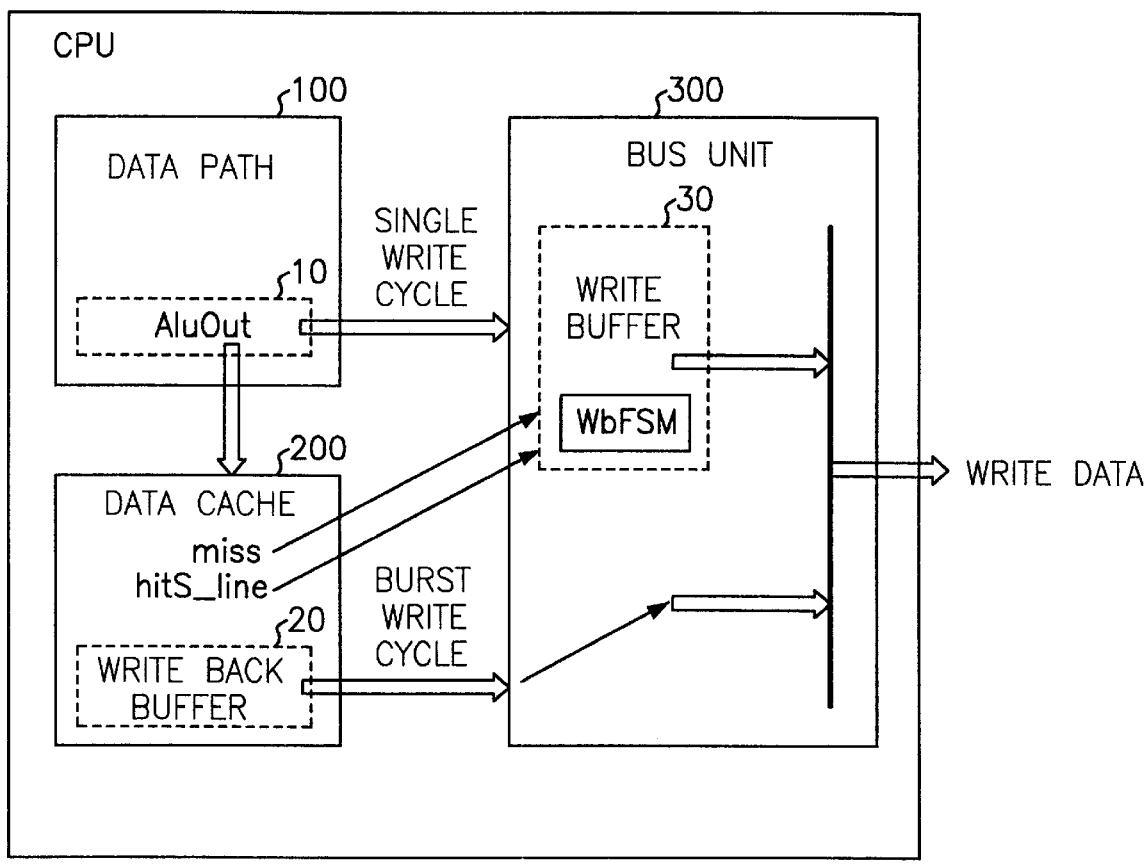
FIG. 1 depicts a conceptual diagram of a processor having a write buffer in accordance with the present invention.
Figure 2:
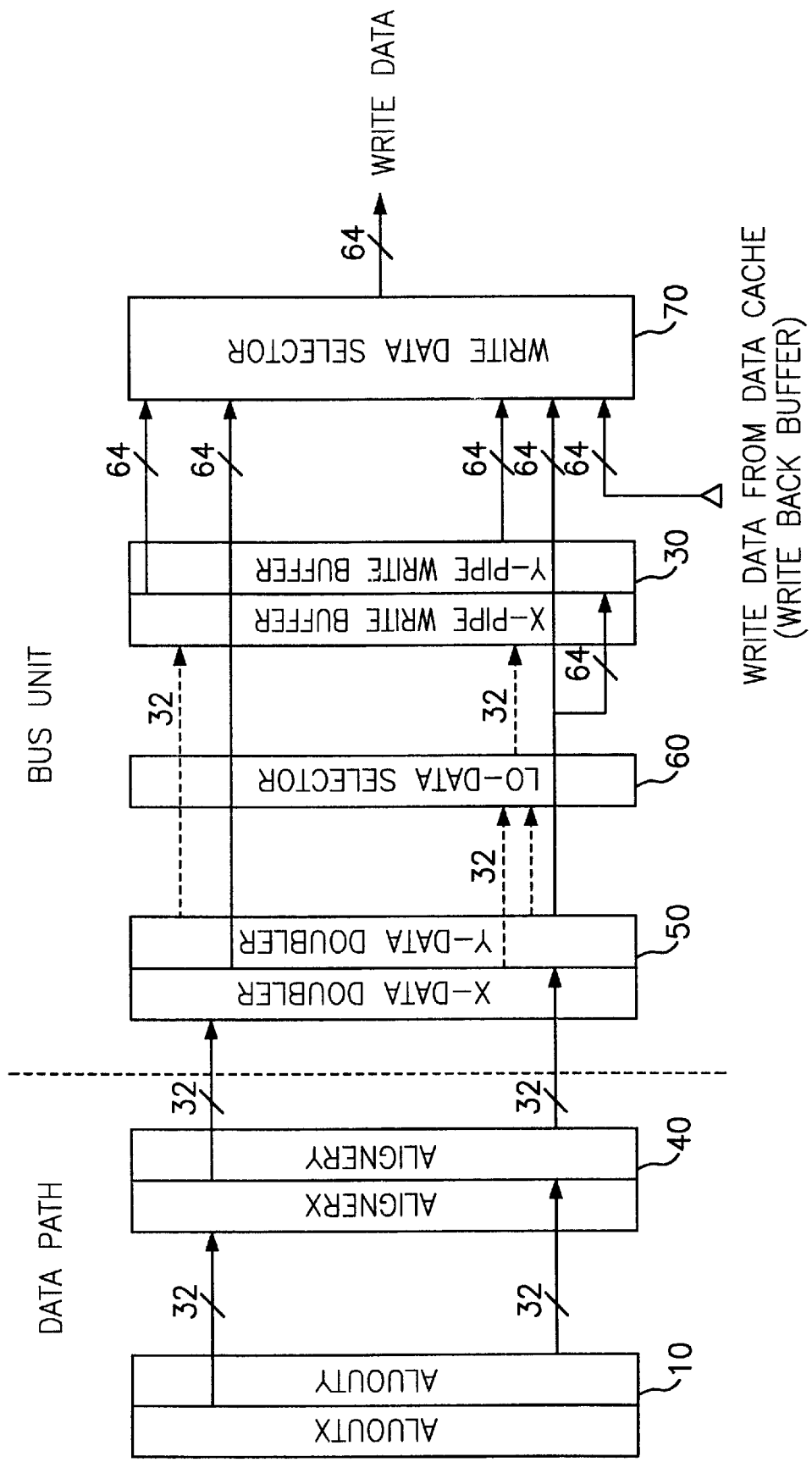
FIG. 2 represents a conceptual diagram illustrating a transfer path of write data in the present invention.

FIG. 1 depicts a conceptual diagram of a processor having the write buffer in accordance with the preferred embodiment of the present invention, and FIG. 2 represents a conceptual diagram illustrating a transfer path of data for a single write cycle.

Describing the transfer path of the data for the write cycle referring to FIGS. 1 and 2, a central processing unit(CPU), e.g., the Pentium™ processor from Intel Corp.,San Jose, Calif., shown in FIG. 1 includes a datapath 100, a data cache 200 and a bus unit 300. The inventive write buffer is divided into a write back buffer 20 and a write buffer 30. The write back buffer 20 is located in the data cache 200 and stores data to be stored in an external memory in a cache line unit, e.g., 32 bytes in a case of a snoop operation or a line replacement. The write buffer 30 is positioned in the bus unit 300 and processes a single write cycle.

The write cycle of the microprocessor has two methods as burst and single cycles. The burst write cycle is performed only in the cache line unit via a path from the write back buffer 20 of the data cache 200 to the bus unit 300. The single write cycle is executed through a path from the datapath 100 to the write buffer 30 of the bus unit 300. When the external write cycle is needed by the data coherency algorithm in performing the writing, that is, when a cache miss for the writing or a hit for a line with a shared 'S' state, as shown in hitS_line in FIG. 1, occurs, a storage is done at the write buffer 30.

It is noted for a reference that the processor employs a MESI protocol in order to correspond to a cache data coherency algorithm, wherein 'M' is an initial letter of 'Modified' and indicates a change for cache data in comparison with data of the memory, namely, the cache stores current data meanwhile the memory stores old data; 'E' represents 'Exclusive' and explains one cache contained in a processor owns a data line corresponding to that stored in the external memory, exclusively; 'S' means 'Shared' and represents a state of using a corresponding line commonly with another cache; and 'I' represents 'Invalid' and indicates whether the current data stored in the cache is valid or invalid. Herewith, when a line to be used has a hit occurrence and a state of the line is the 'S' state, namely in a state of a shared line, the external write cycle is processed in order to inform another cache or memory of contents change.

Referring to FIG. 2, a path of the write data is illustrated in detail. The data is first inputted to a temporal register ALUOUT 10 which stores a computation result, when a shifter or an arithmetic and logical unit ALU of the data path 100 finishes a computation. In a case of the microprocessor such as the Pentium™ processor from Intel Corp., San Jose, Calif., it is constructed by the superscalar structure having two pipelines, thus, there are respectively two units in such system, correspondingly to the structure of two pipelines. For distinguishing between two pipelines, the name of each unit is provided herein with each letter 'X' and 'Y' added to an end thereof.

The data is next applied to an aligner 40 for aligning the data so that the data based on a start address is written in the cache. The data is thereafter inputted to a data doubler 50 of the bus unit 300, which employs two same data, each having 32 bits, to thereby generate data of 64 bits. In the data path 100, the data is calculated in a 32-bit unit, therefore the data is still 32 bit after the aligning process is performed in order for writing the data in the cache. The data of 32 bits is then doubled in order to match with the aspect that a width of a microprocessor data bus is 64 bits and a corresponding byte enable signal is set. At the same time as such operation, information including the start address is transferred to the data cache 200, and its corresponding signal is transmitted to the write buffer 30 when a state of the line is the 'S' state, even though a cache miss or a cache hit occurs according to a checking result for the cache, and the corresponding data is accordingly latched therefrom.

A lo-data selector 60 of the bus unit 300 is employed to handle a case where all X and Y pipelines can be used to produce the data of 64 bits according to a specific instruction word.

The write buffer 30 stores the transfer data then provides externally the data in a case of obtaining a bus cycle, when a signal instructing the writing of the data at the write buffer 30 is received thereat from the data cache 200. Meantime, when the data is written at an input/output apparatus, its cycle is processed directly at the input/output apparatus without writing at the write buffer 30, and the write buffer 30 waits until the cycle is completed. The writing at the input/output apparatus is performed through a use of a path from the data doubler 50 of each pipe to a write data selector 70, as shown in FIG. 2.

Figure 3:
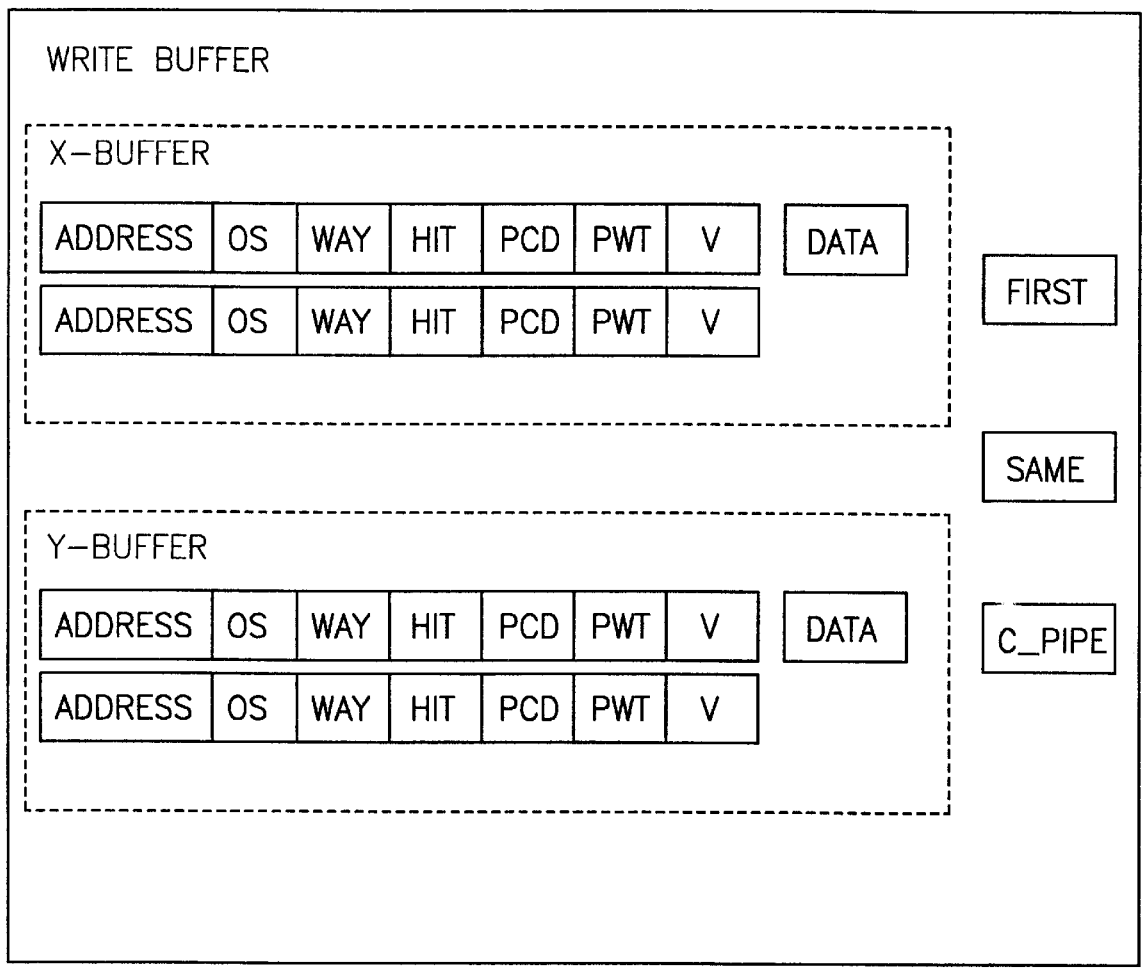
FIG. 3 provides a diagram showing respective bit blocks constructing the inventive write buffer.

Referring to FIG. 3, there is shown a diagram showing respective bit blocks of the write buffer 30. The write buffers are assigned to each of the pipelines one by one since the write buffer is based on the superscalar structure. As shown, there exists only one bit block for 'DATA' in respective X and Y-buffers corresponding to each of the pipelines. On the other hand, two bit blocks exist for the remaining parts of each buffer. Such two blocks for the remaining parts except the bit block for 'DATA' respectively store information concerned with two lines for processing the cycles two times by way of preparation for a case of a cycle extending on a boundary of a cache line. That is, two blocks are needed since the process by the single cycle can not be executed for such case of the extending cycle on the cache line. Such information storage for two lines is further used for a comparison of addresses in a case of a snoop requirement. When a normal operation is executed without the case of the cycle extending on the boundary of the cache line, only one block for each part is used and the operation will be called a 'normal' operation herewith. The other block for each part is called a 'backup' operation and used only for an case of the cycle extending on the boundary the cache line.

Respective information contained in the buffers is described as follows.

'ADDRESS' represents addresses necessary for performing the write cycle. 'OS' means the volume of write data, namely the amount of operand, and is used with the lower 3 bits of the address to thereby generate a byte enable signal. At a 'WAY' block, a 'WAY' value of an 'S' state, namely the shared state, is stored thereat and is used when a state of a cache line is varied according to a state of an external pin in a case of a hit occurrence on a line of the 'S' state. 'HIT' is the block for detecting whether information of the write buffer is written by a cache miss or a hit occurrence on a line of the 'S' state. 'PCD' and 'PWT' are used for controlling an external cache, and also used for changing a cache state in a case of the hit occurrence on the line of the 'S' state. 'V' indicates valid bits, that is to say, whether contents of current stored data is valid or not. 'DATA' is data to be written.

'FIRST' represents a buffer formerly written between two buffers so that a preferential process for the buffer formerly written is executed. 'SAME' means the data is simultaneously written at both buffers, and in such a case, a process for the X-buffer is done earlier than the Y-buffer. 'C_PIPE' manifests that the cycles for the write buffer are being currently processed simultaneously, since two cycles at maximum may be processed at the same time in a microprocessor bus cycle such as the Pentium™ (Intel Corp. San Jose, Calif.) bus cycle.

Operations for controlling the write buffer 30 constituted by several parts are as follows.

The write buffer 30 serves as a temporary buffer for storing data of the single write cycle in the memory. If there exists a write cycle standing-by at the buffer, such a write cycle can be represented by valid bits. These valid bits become all 'zero' when the system is reset, while, when the system operates normally, the valid bits are set by the data cache 200 then reset by the bus unit 300. The valid bits can be always set by a digit of 1 according to a request of the data cache 200, except in the case that the write buffer 30 is filled up with data. A resetting operation can be done only when a state machine of the write buffer 30 is under an update state.

As described in FIG. 3, the X and Y-pipelines have each one write buffer and each of the write buffers has one 'backup' buffer portion by way of preparation for a case of the cycle extending on a boundary of the cache line. From a cycle processing standpoint, a 'normal' and the 'backup' buffer portions are regarded as one buffer, while in a processing operation of the valid bits, the 'backup' buffer portion is regarded as distinct from the 'normal' buffer portion. In executing the writing in the buffer, the writing can be performed only in a case that all the bits are invalid. That is to say, if any one out of the valid bits is set for validity in checking the valid bits at the write buffer 30, a request for the writing at the buffer is unavailable. In clearing the valid bits, it should be first checked on the basis of 'FIRST' bits whether or not a corresponding buffer is in process, i.e., in a service state, corresponding to the writing.

The writing operation at the backup buffer portion is available, only after receiving a split cycle signal representing that a cycle is extending on a boundary of the cache line, from the data cache 200. In performing the writing in the normal buffer portion, as above-mentioned, all the valid bits of the normal and the backup buffer portions need to be checked for a validity and the writing at the normal buffer portion is available only in an invalid state of all the valid bits at the normal and backup buffer portion. In performing the writing in the backup buffer portion, meanwhile, only the backup buffer portion may be checked for a validity of the bits since the writing in the backup buffer portion is performed after a completion of the writing in the normal buffer portion. Describing more in detail, there is actually no need for checking the valid bits of the backup buffer portion since a writing request for the write buffer 30 is available only after clearing all the valid bits of the normal and the backup buffer portions.

In clearing the valid bits under an UPDATE state among operations for controlling the write buffer 30, the clearing the valid bits of the normal buffer portion is processed after a comparison with the 'FIRST' bits and the clearing the valid bits of the backup buffer portion is processed after a checking for the 'FIRST' bits and the valid bits of the backup buffer portion.

The 'FIRST' indicates bits representing a buffer written prior to another buffer or a buffer to be earlier processed for the writing. In a step of a request state REQ among the operations for controlling the write buffer 30, in case that a snoop hit appears under a stand-by state, a state of the 'FIRST' bits can be changed in order to process first the buffer. To simplify the process, however, the snoop hit signal HITM# is provided till a process of the earlier hit buffer is completed.

When a setting for the 'FIRST' bits is performed under an 'IDLE' state in executing the writing in the buffer, a toggle is performed under the UPDATE state, namely under a completion state of a cycle process; meanwhile when the backup valid bits are set by the split cycle, the toggle is not performed.

The 'SAME' is set only in a case that two buffers have the writing at the same time, and in such a case, a buffer of the X-pipeline is in a cycle service state earlier. The clearing operation for the 'SAME' bits is done under the UPDATE state, and when the split cycle is provided under the 'UPDATE' state, the existing value is maintained.

The 'HIT' represents that the writing in the write buffer 30 is executed by a cache miss or by a shared line. A cache state should be changed according to a state of a WB/WT# pin, thus such 'HIT' bits need to get information therefrom.

A cache state is already changed when a hit for an external snoop occurs, therefore, an update signal is not generated. That is, the 'HIT' bits compulsorily become a low state when a hit for the external snoop occurs.

The write buffer 30 is employed for the purpose of temporarily storing data for a cycle to be processed externally, thus, when the cycle can be processed externally, the cycle should be processed externally. Such cycle process and the update operation for each part of each of the buffers are achieved by a state machine such as a "WbFSM".

Figure 4:
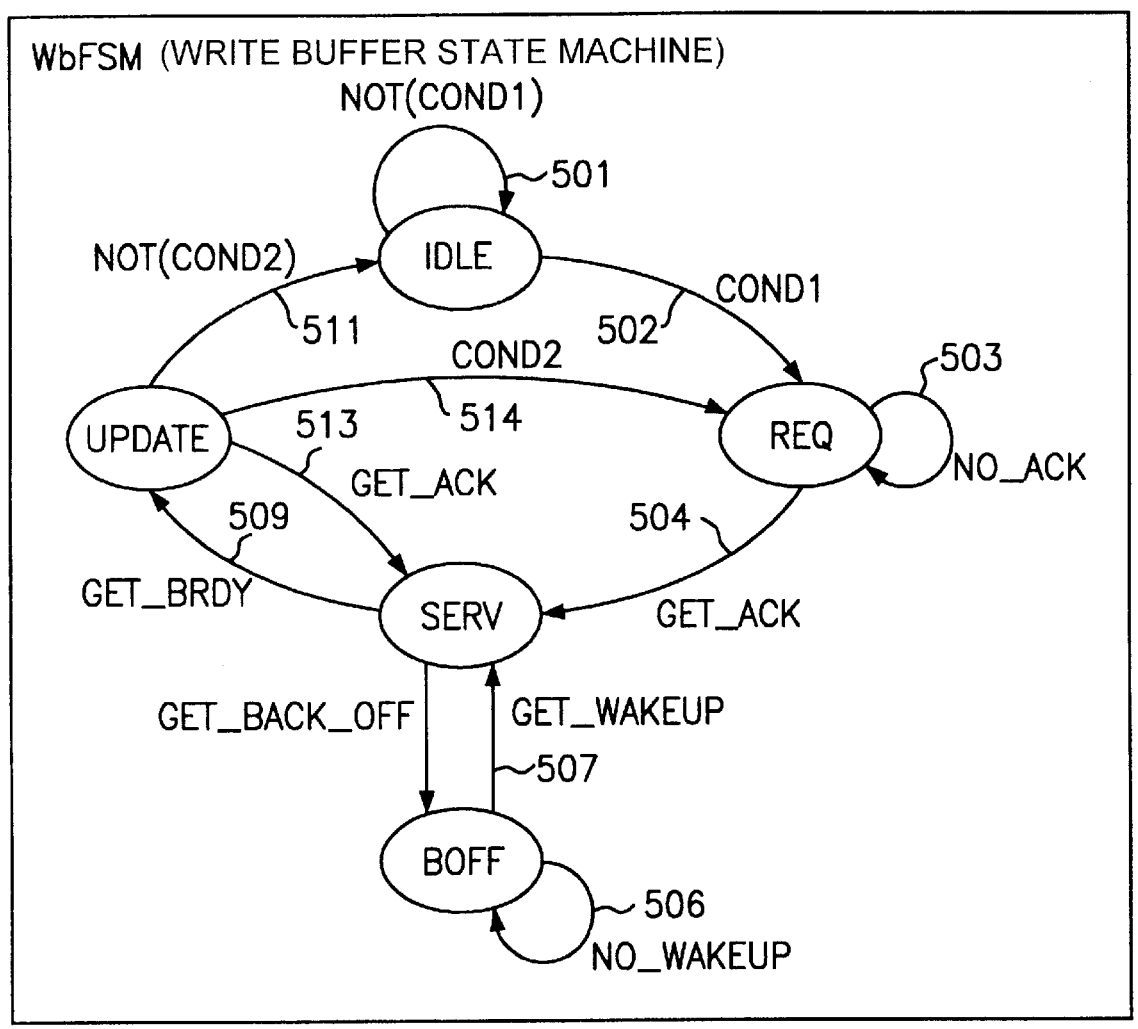
FIG. 4 sets forth a state machine for controlling the inventive write buffer.

The WbFSM includes five states as shown in FIG. 4 and meanings for the respective states are as follows.

'IDLE' indicates a state that all the valid bits at the write buffer 30 are cleared, namely a vacant state of the write buffer 30. The request 'REQ' means a state the write buffer 30 stores data for the cycle, namely a state that the cycle is not yet progressed externally and a state for consecutively requesting the cycle from a bus cycle arbitrator in order for an external cycle progression. 'NO_ACK' represents that there is no response to the request 'REQ' and 'GET_ACK' denotes that a response to the request 'REQ' or 'UPDATE' is received to process a requested cycle. A service 'SERV' provides a state the cycle is being currently progressed externally by receiving a cycle acknowledgement signal from the arbitrator. A backoff 'BOFF' manifests a state in which an external unit system requests a backoff, namely a stopping of a bus cycle progression and a float of the bus, thus a cycle stopping state. 'GET_BACK_OFF' represent that there is a request for the backoff; 'NO_WAKEUP' denotes that the backoff is maintained; and 'GET_WAKUP' represents that the backoff is terminated. The 'UPDATE' is an updating state at each part of the buffer under a completion state of the cycle process.

'COND1' in FIG. 4 shows an input of a signal indicating the writing at the write buffer 30, the signal being inputted from the data cache 200. 'COND2' represents that there is further a cycle to be processed at the other buffer after a cycle completion of one buffer. 'GET_BRDY' provides a completion for a progressing cycle.

Figure 5:
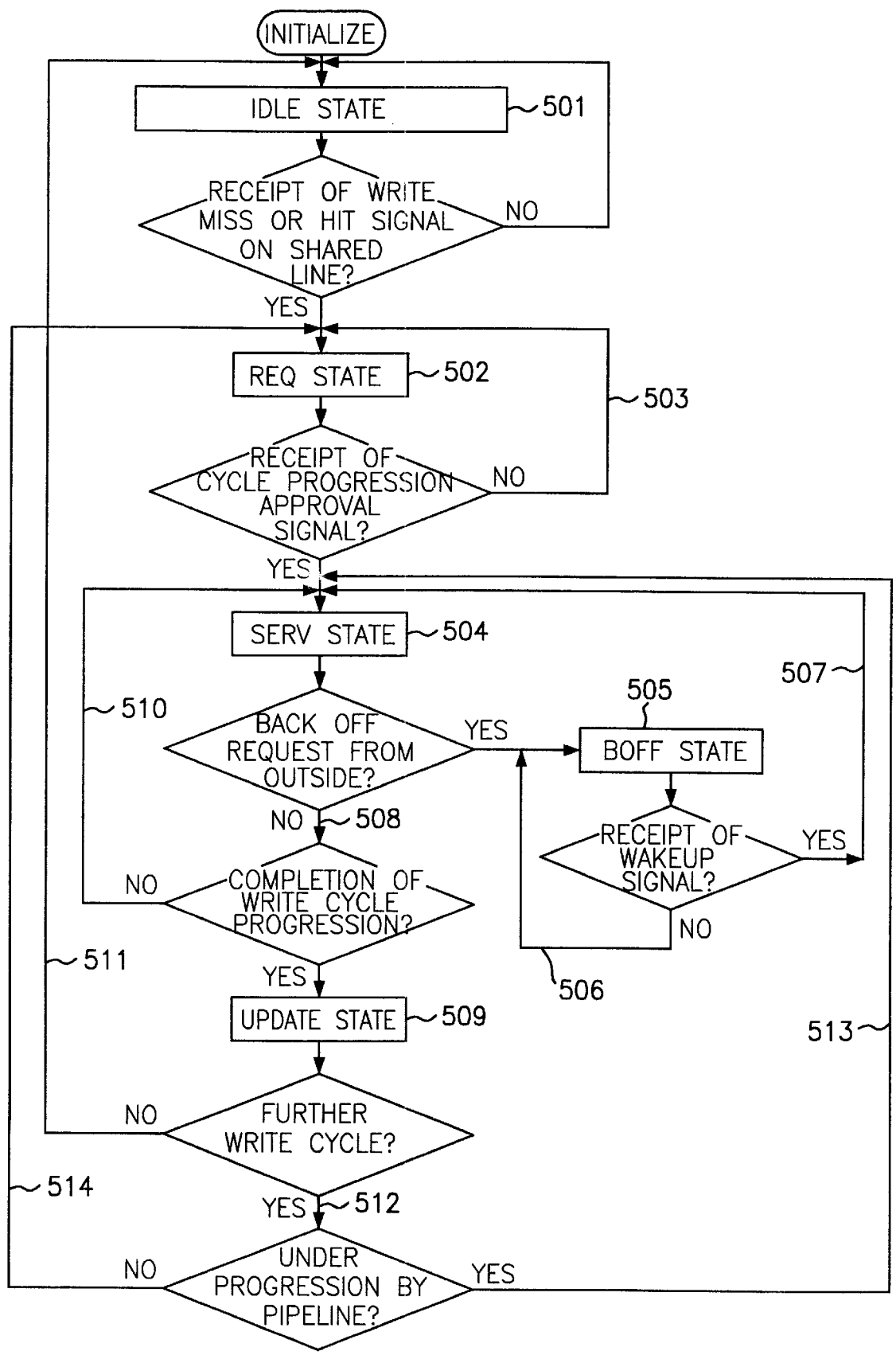
FIG. 5 illustrates a flow chart representing operations of the state machine shown in FIG. 4.

Operations of the state machine are described more in detail as follows, referring to FIG. 5.

In an IDLE state 501, the state 501 is maintained continuously, unless a signal indicating a cycle reception is provided from the cache. In a next step, the state machine transitions to the request state REQ 502 becomes in response to a signal representing an occurrence of a cache miss for the writing or a cache hit for a line of a 'S' state. Under such a request state REQ, a signal of a cycle progression request to the cycle arbitrator is received consecutively and the state machine maintains a stand-by state 503. When a cycle acknowledgement signal is received in such stand-by state, the state machine transitions to a service state SERV 504. In the service state SERV 504, the 'FIRST' part and the 'SAME' part, for the write buffer 30 are checked, to then process a cycle for a buffer to be earlier processed.

In such service state SERV 504, if a bus cycle pipeline signal is applied to the microprocessor from an external unit and if there is another buffer in a stand-by state, the C_PIPE bits are set to progress two cycles at the same time. If a back-off request from the external is applied thereto in the midst of the cycle progression, the progressing cycle is stopped to then go to a back-off state BOFF 505. In the back-off state BOFF 505, the state is maintained in a step 506 until a wake-up signal instructing an escape from the current state is provided from a bus controller. That is, if the wake-up signal is received under the back-off state BOFF, the state machine transitions to the service state SERV in a step 507, if not, the back-off state BOFF is maintained.

If a back-off request is not applied thereto in the service state SERV, the state machine transitions, in the state 508, to the UPDATE state 509 in case that a progression of the cycle is completed, and the state machine transitions to the service state SERV in a step 510 in case that the progression of the cycle is not completed. In the UPDATE state 509, several bit blocks of the buffer are updated. In such an update state, if the cycle was stored at the write buffer 30 by a cache miss for the writing, only the valid bit of a corresponding buffer is cleared; if the storage is done by a cache hit for a line of the 'S' state, a cache state is updated according to a state of a WB/WT# pin applied from the external unit and a state of the 'PWT' bits. At this time, information transferred to the cache includes information being a partial portion among the 'WAY' bits and the 'ADDRESS' bits, and information representing a state of a cache line to be updated.

When the snoop request is applied thereto from an external system, an address in the valid bits of each buffer is compared with a snoop address. If there occurs a snoop hit in such comparison, the hit becomes a hit for data to be written at an external memory. Accordingly, the memory must be updated. That is, like in a hit case for a modified line, the hit is informed externally through a use of HIT# and HITM# pins and a request of the corresponding buffer is processed first.

If there is no further write cycle to be processed in the update state, the state machine transitions to the IDLE state in a step 511; if there are further write cycles to be processed, the state machine transitions, in a step 512, to check whether the cycle is already in process by the pipeline, and if the cycle is in process, the state machine transitions to the service state SERV in a step 513. If not, the state machine transitions to the request state REQ in a step 514.

In accordance with another preferred embodiment of the present invention, the write buffer may be employed between a processor and an external memory by modifying respective parts of the buffer, without a limitation to an element of the processor.

Especially in a shared memory, for use in a multi-processor system, there may be caused a bottle neck on a path passing into a memory since requirements for a memory use are requested from several processors. Such phenomenon can be settled to improve the systematical performance by installing the inventive write buffer in each processor.

As afore-mentioned, there is in the inventive write buffer an effect of reducing writing cycles and improving the systematical performance particularly in a processor using a superscalar structure. That is, a processor having the inventive write buffer may replace a conventional processor, wherein the conventional processor is in need of a considerable number of cycles in writing the write data, and, thus does not get a performance improvement Especially in a system of the superscalar structure.

Although the invention has been shown and described with respect to the preferred embodiments, it will be understood by those skilled in the art that various changes and modifications may be made without departing from the spirit and scope of the invention as defined in the following claims.

What is claimed is:

1. A processor of a superscalar structure having a datapath for carrying data, a data cache, a bus unit, a first pipeline and a second pipeline said processor comprising:

a write buffer equipped in said bus unit said write buffer being divided into a first buffer and a second buffer respectively corresponding to said first pipeline and said second pipeline, each of said first and second buffers including, a first bit block having an address necessary for processing a write cycle; a second bit block having a volume of an operand, said second bit block being used with a lower 3 bits of the address to thereby generate a byte enable signal;

a third bit block for transferring bits used for an index, out of the address, to a cache, when writing is performed at the write buffer by a write hit occurrence for a cache line having a shared 'S' state, the 'S' state being a state of using commonly a corresponding line with another cache;

a fourth bit block for checking whether information at said write buffer is written by a cache miss or a hit occurrence on a cache line having said 'S' state;

a fifth bit block for controlling an external cache and modifying a state of the cache in a case of a hit occurrence on a cache line having said 'S' state;

sixth bit block for confirming whether or not currently stored data is valid; and a seventh bit block for storing the data to be written; and a write back buffer in said data cache; wherein said write buffer receives data of a burst write cycle from the write back buffer and data on the datapath of a single write cycle from the datapath.

2. The processor of claim 1, wherein each of said first and second buffers further includes a backup buffer portion for the respective bit blocks except said seventh bit block.

3. A processor of a superscalar structure, having a datapath for carrying data, a data cache, a bus unit, a first pipeline and a second pipeline, said processor comprising:

a write buffer equipped in said bus unit, said write buffer being divided into a first buffer and a second buffer respectively corresponding to said first pipeline and said second pipeline, said write buffer further including,
- a first bit block representing a firstly written buffer to be thus processed earlier between said first and second buffers;
- a second bit block indicating that said first and second buffers are simultaneously written; and
- a third bit block offering that current cycles stored at the write buffer are pipelined to each other; and a write back buffer in said data cache; wherein said write buffer receives data of a burst write cycle from the write back buffer and data on the datapath of a single write cycle from the datapath.

4. A processor of a superscalar structure, having a datapath for carrying data a data cache, a bus unit, a first pipeline and a second pipeline, said processor comprising:

a write buffer equipped in said bus unit, said write buffer being divided into a first buffer and a second buffer respectively corresponding to said first pipeline and said second pipeline;

a write back buffer in said data cache; wherein said write buffer receives data of a burst write cycle from the write back buffer and data on the datapath of a single write cycle from the datapath; and a state machine for controlling said write buffer in order to store data of the write cycle thereat and process the write cycle data externally and update the buffer, said state machine including,
- a first state as an idle state that all valid bits are cleared from said write buffer, said idle state representing a vacant write buffer;
- a second state of requesting consecutively a bus cycle arbitrator for the write cycle in order to process the write cycle externally, wherein data of the write cycle is stored at the write buffer by a cycle storage operation in said first state and the write cycle is not yet processed externally;
- a third state of receiving a cycle acknowledgment signal from the bus cycle arbitrator and processing the current cycle externally;
- a fourth state that the processing of the write cycle is stopped by a request from an external unit system for a stopping of a bus cycle and a float of a bus in the midst of processing the write cycle; and
- a fifth state of updating each block of said write buffer after a completion of a cycle process.

5. The processor of claim 4, wherein said state machine controls the write buffer, so that the first state transitions to said second state when a cache miss for writing or a hit signal for the shared line is received in the first state; the second state transitions to said third state when a cycle processing approval signal from the external unit is received in the second state; the third state transitions to said fourth state when a back-off request is received from the external unit in the third state; the third state transitions to said fifth state when a cycle processing is completed and there is no back-off request from the external unit in the third state; the fifth state transitions to said first state if there is no further write cycle to be processed in the fifth state; the fifth state transitions to said third state if the write cycle is in the midst of a processing by checking whether or not the write cycle is already being processed through the first or second pipeline, and there are consecutive write cycles in the fifth state; and the fifth state transitions to said second state if the write cycle is not being processed in the fifth state.

* * * * *